United States Patent [19]

Ziegler

[11] Patent Number: 4,735,240

[45] Date of Patent: Apr. 5, 1988

[54] DEVICE FOR DETECTING THE FILLING LEVEL IN A CONTAINER

[75] Inventor: Klaus Ziegler, Furtwangen, Fed. Rep. of Germany

[73] Assignee: VDO Adolf Schindling AG, Frankfurt am Main, Fed. Rep. of Germany

[21] Appl. No.: 940,014

[22] Filed: Dec. 10, 1986

[30] Foreign Application Priority Data

Dec. 10, 1985 [DE] Fed. Rep. of Germany ....... 3543528

[51] Int. Cl.$^4$ .............................................. B65B 3/04
[52] U.S. Cl. ...................................... 141/65; 141/95; 141/98; 137/392; 340/614
[58] Field of Search ...................................... 141/1–12, 141/95, 96, 94, 198, 98, 65, 66; 340/614; 33/558; 137/392

[56] References Cited

U.S. PATENT DOCUMENTS 4,375,764  3/1983  Lawford et al. .................... 340/614

Primary Examiner—Houston S. Bell, Jr.
Attorney, Agent, or Firm—Martin A. Farber

[57] ABSTRACT

A device for detecting a filling level in a container having an electro-mechanical transducer 4 which is secured to a diaphragm 5 for vibrating the diaphragm 5. Furthermore an electrical device is provided for activating the oscillations of the diaphragm 5. The diaphragm 5 has a holder 1 on which the diaphragm is fastened by means of a cylindrical intermediate member 6. The holder 1 has a holder projection 7 which, with play, is enclosed and engaged by the cylindrical intermediate member 6. The intermediate member 6 is disposed on the holder projection 7 by an elastic play equalization element which is located between the holder projection 7 and the intermediate member 6.

14 Claims, 1 Drawing Sheet

U.S. Patent    Apr. 5, 1988    4,735,240
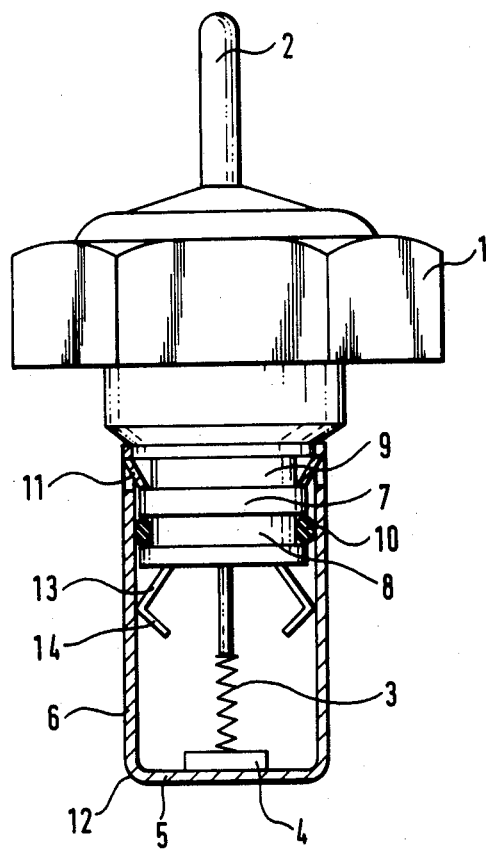

DEVICE FOR DETECTING THE FILLING LEVEL IN A CONTAINER

FIELD AND BACKGROUND OF THE INVENTION

The invention relates to a device for detecting the filling level, particularly of a liquid in a container, by an electro-mechanical transducer secured to a diaphragm, by which transducer the diaphragm is made to oscillate with an oscillatory displacement. The transducer operates with electrical circuit means for establishing oscillations within the diaphragm, as well as within a holder of the diaphragm on which the diaphragm is fastened by means of a cylindrical intermediate member. Characteristics of sonic signals imparted to the liquid by the transducer are dependent on the amount of liquid present in the container. These characteristics are employed by the electrical circuit means to measure the liquid level.

Such known devices may not have very high resistance against various external influences which act on them. These influences may impair the operation of the device. Such influences result, for example, in distortions of the diaphragm, which may be brought about by temperature fluctuations or by deformation of the fastening of the cylindrical intermediate member with the holder. Furthermore, acoustic impairments and deformation of the diaphragm can occur, which can impair the measurement.

SUMMARY OF THE INVENTION

It is an object of the invention therefore to provide a device of the type set forth above, which can be constructed in a simple and inexpensive manner has a high measuring sensitivity with simultaneous insensitivity to the above-mentioned external influences.

According to the invention, the holder (1) has a holding projection (7) which is engagable thereabout with play by the cylindrical intermediate member (6), whereby the intermediate member (6) is disposed on the holder projection (7) by an elastic play equalization element located between the holder projection (7) and the intermediate member.

This structure leads to a practically complete decoupling of the diaphragm and intermediate member from the holder, so that external influences are kept away from the sensitive diaphragm. Simultaneously, a transmission of oscillations from the diaphragm to the holder is avoided, so that the oscillation energy of an electro-mechanical transducer, which may be a piezo-electric component, remains concentrated in the diaphragm without dissipation of energy utilized in the measurement process. This makes possible an optimum measurement.

The holder projection (7) can be cylindrical in order to obtain uniformity in a holding action of the holder.

Simplicity of manufacture as well as a secure holder are achieved by providing the holder projection (7) with a radial annular groove on its cylindrical surface, in which groove there is placed an O-ring (10) which forms a play equalization element.

In order to prevent a release of the intermediate member from the holder projection, in which the intermediate member is axially glided or slid away axially from the holder projection, a safety element can be located between the cylindrical intermediate member (6) and the holder projection (7) to prevent an axial relative movement of these two parts.

It is advantageous to construct the cylindrical intermediate member with radially inwardly directed safety arms (11) which project in a recess of the holder projection (7). This can be simply produced when the recess is a radially circumferential annular groove (9) on the cylindrical surface of the projection (7).

Additional components can be avoided by forming the safety arms (11) as bent-out portions of the cylindrical wall of the intermediate member (6), which bent-out portions are deformed radially inwardly in the recess of the projection. This formation is easily producable and also facilitates simple assembly.

Simplified construction results from constructing the diaphragm (5) and the cylindrical intermediate member (6) from a pot-like one-piece component. In this manner preferably the diaphragm (5) on its radially circumferential edge joins with a radius bend (12) into the cylindrical intermediate member (6). Increasing the radius of the bend reduces the coupling of oscillations of the diaphragm from the intermediate member.

The play equalization element preferably is located in the vicinity of an opening of the cylindrical intermediate member (6), which opening faces the holder (1), because a coupling of oscillations of the diaphragm to the holder is reduced with increasing spacing between the diaphragm and the elastic play equalization element. Such coupling is reduced also by forming the cylindrical intermediate member to be as long as possible.

Preferably the play equalization element should be located on the cylindrical intermediate member at a distance from the diaphragm (5), which is larger than the diameter of the diaphragm (5).

An equalization of production tolerances as well as a balance to nominal or desired values of the device can be attained readily by balancing the device by removal of material from the diaphragm which is connected with the cylindrical intermediate member.

For this, particularly, a directed cutting of material can be done by means of a laser by eroding, or by grinding.

The cylindrical intermediate member can serve preferably as a ground conductor contacted by spring arms which are fastened conductingly to the holder for grounding. The spring arms can be fastened at the sides of a free face of the holder projection, and are in engagement within the range of their free ends on the inner wall of the cylindrical intermediate member.

BRIEF DESCRIPTION OF THE DRAWING

With the above and other objects and advantages in view, the present invention will become more clearly understood in connection with the detailed description of a preferred embodiment, when considered with the accompanying drawing, of which the sole FIGURE is an axial cross-sectional view of a device in accordance with the invention.

DETAILED DESCRIPTION OF THE PREFERRED EMBODIMENT

Referring to the drawing, the device according to the invention has a holder 1 with which the device can be fastened to a wall (not illustrated) of a liquid container. The device includes an electrical connection 2 upstanding from the holder 1 which, upon a mounting of the device within the container, projects outwardly of the container. The connection 2 is connected via a flexible electrical line 3 to an electro-mechanical transducer 4 comprising a piezo-electric component.

In the assembled condition the portion of the device directed toward the transducer 4 projects into the liquid container. The transducer 4 is secured to a diaphragm 5, which diaphragm connects with the holder 1 by means of a cylindrical intermediate member 6. In this manner a chamber formed within the intermediate member 6 is tightly, hermetically sealed-off with respect to an inner chamber of the liquid container.

The holder 1 has a cylindrical holder projection 7 which with play is enveloped and gripped by the cylindrical intermediate member 6. The holder projection 7 has on its cylindrical surface two adjacent radial circumferential annular grooves 8 and 9.

In the annular groove 8 which is closer to the free end of the holder projection 7, there is disposed an elastic O-Ring 10 having a round outer surface which contacts, with pre-stress, the inner wall of the cylindrical intermediate member 6 for holding the member 6.

In the vicinity of an opening of the intermediate member 6, which opening faces the holder 1, portions of the wall of the intermediate member 6 are bent in to provide projections in the form of safety arms 11, the free ends of which are deformed by contact with the groove 9 upon projecting radially inwardly into the groove 9. The safety arms 11 prevent an axial relative movement between the holder projection 7 and the cylindrical intermediate member 6.

The diaphragm 5 and the cylindrical intermediate member 6 are constructed as a pot-like shaped one-piece component wherein the diaphragm 5 joins at its circumferential edge with the cylindrical intermediate member 6 by a radially curved junction 12.

The foregoing pot-like component is formed of metal and serves as a ground conductor. Ground conducting spring arms 13 are fastened on the free front side of the holding projection 7 to contact, within the range of their free ends 14, the inner wall of the cylindrical intermediate member 6 with pre-tension or pre-stress. In this manner, a ground contact for the intermediate member 6 is produced, and oscillation impairment of the diaphragm by oscillation is avoided.

It is to be understood that the above described embodiment of the invention is by way of illustration only and that modifications thereof may occur to those skilled in the art. Accordingly, this invention is not to be regarded as limited to the embodiment disclosed herein, but is to be limited only as defined by the appended claims.

I claim:

1. In a system for detecting a filling level of a liquid in a container, a device mountable on the container for detecting a level during filling, storage and evacuation of liquid of the container, said device comprising:
    a diaphragm and an electro-mechanical transducer secured to the diaphragm, said transducer imparting oscillation to said diaphragm upon energization of the transducer;
    electrical means for energizing the transducer to induce oscillations of the diaphragm;
    a holder of the diaphragm; and
    an intermediate cylindrical member for securing the diaphragm to said holder; the improvement wherein
    said holder includes a holder projection, said member enclosing and engaging said projection with play;
    said device further comprising an elastic play equalization element disposed between the holder projection and the intermediate member to provide said play between the holder projection and the intermediate member.

2. The device according to claim 1, wherein
said holder projection is cylindrical.

3. The device according to claim 2, wherein
said holder projection has a radial annular groove on an outer cylindrical surface of the holder projection; and wherein
said play equalization element comprises an O-ring which is located in said groove.

4. The device according to claim 1, further comprising
a safety element disposed between said cylindrical intermediate member and said holder projection, said safety element preventing an axial relative movement of said cylindrical intermediate member and said holder projection.

5. The device according to claim 4, wherein
said safety element comprises safety arms which are a part of said cylindrical intermediate member, said arms being radially inwardly directed to project in a recess of said holder projection.

6. The device according to claim 5, wherein
said recess is a radially circumferential annular groove on an outer cylindrical surface of the projection.

7. The device according to claim 5, wherein
said safety arms are bent-out portions of a cylindrical wall of said intermediate member, said bent-out portions being deformed radially inwardly in the recess of said projection.

8. The device according to claim 1, wherein
said diaphragm and said cylindrical intermediate member form a pot-like one-piece component.

9. The device according to claim 8, wherein
said diaphragm on its radially circumferential edge joins via a radius bend into said cylindrical intermediate member.

10. The device according to claim 1, wherein
said play equalization element is located in a vicinity of an opening of said cylindrical intermediate member, and which opening faces said holder.

11. The device according to claim 1, wherein
said play equalization element is located on said cylindrical intermediate member and is spaced apart from said diaphragm by a distance which is larger than the diameter of said diaphragm.

12. The device according to claim 1, wherein
the device can be balanced by removal of material from said diaphragm at a location of connection with said cylindrical intermediate member.

13. The device according to claim 1, wherein
said cylindrical intermediate member serves as a ground conductor, there being spring arms extending from said holder and being in contact with said ground conductor, the spring arms being fastened conductively to the holder for electrical grounding of the intermediate member 14. The device according to claim 13, wherein
said spring arms are fastened at sides of a free face of said holder projection, and are in engagement with a range of its free ends on the inner wall of the cylindrical intermediate member.

* * * * *